United States Patent
Blanchard (12)

(10) Patent No.: US 10,787,372 B1
(45) Date of Patent: Sep. 29, 2020

(54) SOLAR-POWERED BUOYANT EVAPORATION SYSTEM

(71) Applicant: E3 Solutions, LLC, Tampa, FL (US)

(72) Inventor: William McBride Blanchard, Tampa, FL (US)

(73) Assignee: E3 Solutions, LLC, Tampa, FL (US)

(*) Notice: Subject to any disclaimer, the term of this patent is extended or adjusted under 35 U.S.C. 154(b) by 0 days.

(21) Appl. No.: 16/723,477

(22) Filed: Dec. 20, 2019

(51) Int. Cl.
*C02F 1/04* (2006.01)
*B01D 1/00* (2006.01)
*B01D 1/20* (2006.01)

(52) U.S. Cl.
CPC ............ *C02F 1/048* (2013.01); *B01D 1/0005* (2013.01); *B01D 1/20* (2013.01); *C02F 2201/008* (2013.01); *C02F 2201/009* (2013.01)

(58) Field of Classification Search
CPC ....... B01D 1/0005; B01D 1/20; B01F 5/0218; B01F 5/0225; B01F 5/0243; B01F 13/0049; C02F 1/048; C02F 2201/008; C02F 2201/009; B41P 2235/26; B05D 1/40
See application file for complete search history.

(56) References Cited

U.S. PATENT DOCUMENTS

| | | | |
|---|---|---|---|
| 3,400,918 A | 9/1968 | MacLaren | |
| 3,669,422 A | 6/1972 | Nogaj | |
| 4,455,226 A | 6/1984 | Lahav | |
| 4,704,189 A | 11/1987 | Assaf | |
| 5,089,120 A * | 2/1992 | Eberhardt | C02F 1/66 114/124 |
| 7,166,188 B2 | 1/2007 | Kedem et al. | |
| 7,604,710 B2 | 10/2009 | Haslem et al. | |
| 8,016,977 B2 | 9/2011 | Rasmussen et al. | |
| 8,579,264 B1 | 11/2013 | Fowles | |
| 9,504,932 B2 * | 11/2016 | Noel | B01D 1/20 |
| 9,828,257 B2 | 11/2017 | Noel et al. | |
| 10,118,138 B2 * | 11/2018 | Tews | B01F 5/0225 |

(Continued)

FOREIGN PATENT DOCUMENTS

CN          205216228 U  *  5/2016  ............... B01D 1/16

OTHER PUBLICATIONS

CN205216228U_ENG (Espacenet machine translation of Wang) (Year: 2016).*

*Primary Examiner* — Jonathan Miller
*Assistant Examiner* — Gabriel E Gitman
(74) *Attorney, Agent, or Firm* — Smith & Hopen, P.A.; Paul Murty

(57) ABSTRACT

A buoyant apparatus that is capable of floating on liquid surfaces, such as bodies of water filled with waste byproducts. The buoyant apparatus supports a plurality of atomizers via rotatable and flexible arms that can achieve 180° adjustments with the respect to a longitudinal axis of the buoyant apparatus, such that the arms can be parallel to a surface of the body of water in both an extended orientation (with the atomizers deployed over the water surface) and a retracted orientation (with the atomizers stored within the surface area of the platform). In addition, the arms can achieve 360° rotational adjustments about the attachment point of the arms to the platform. The atomizers and arms are powered by low voltage direct current (DC) motors that can utilize solar power via photovoltaic cells such that the apparatus can be employed in remote locations without the need for a centralized power grid.

15 Claims, 7 Drawing Sheets

(56) References Cited

U.S. PATENT DOCUMENTS

Figure 1:
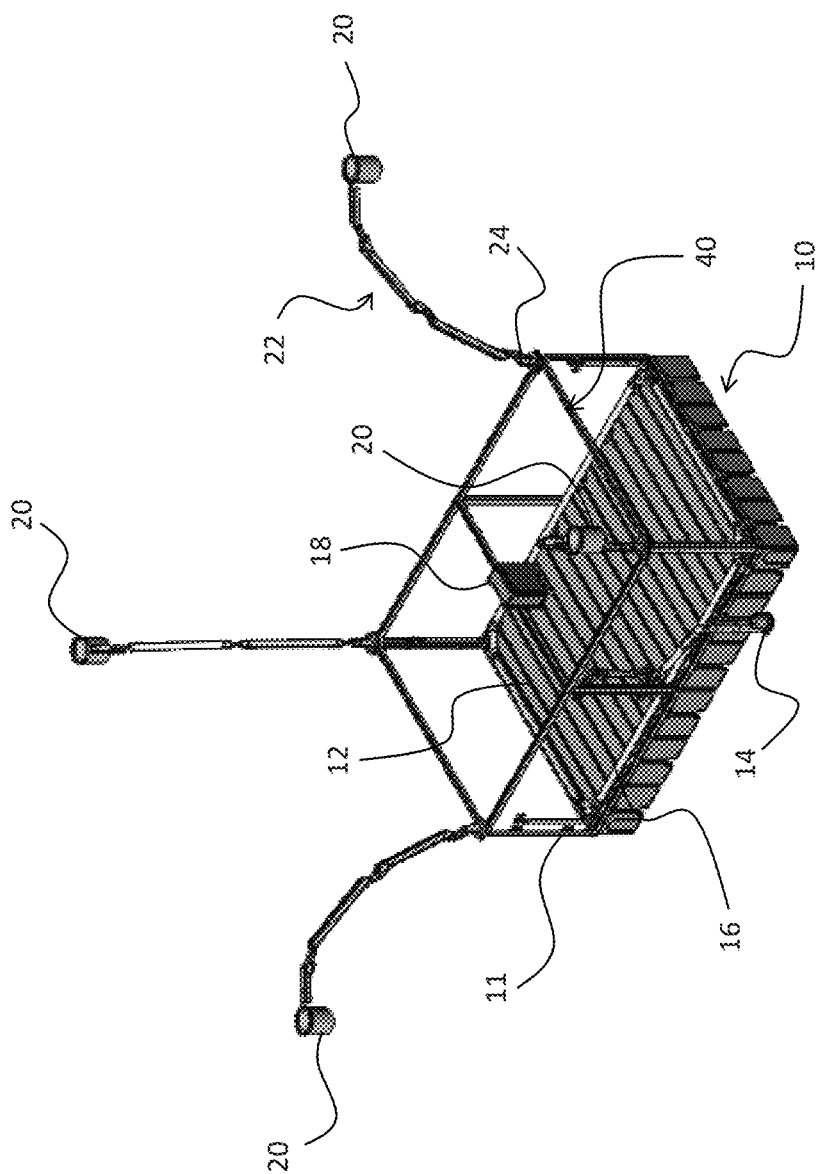

| | | | |
|---|---|---|---|
| 2008/0217437 A1* | 9/2008 | Vanden Berghe | B05B 1/3053 239/583 |
| 2009/0166289 A1 | 7/2009 | Elliot et al. | |
| 2016/0376167 A1* | 12/2016 | Knight | C02F 1/12 159/47.3 |
| 2018/0036692 A1* | 2/2018 | Bearinger | B01F 5/0225 |

* cited by examiner

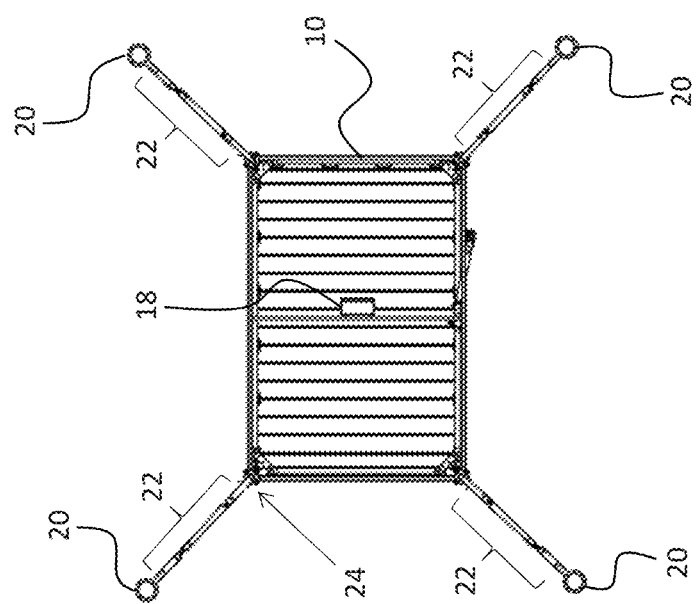

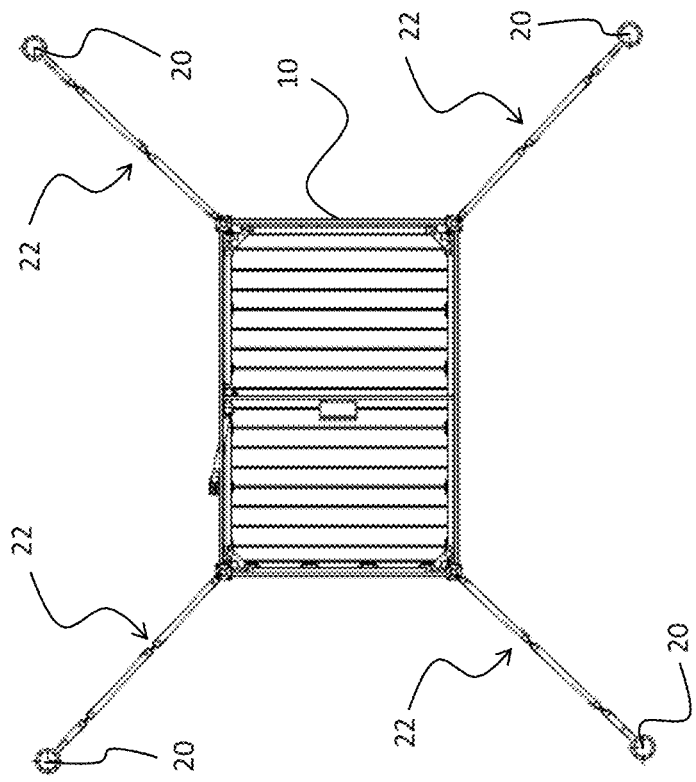
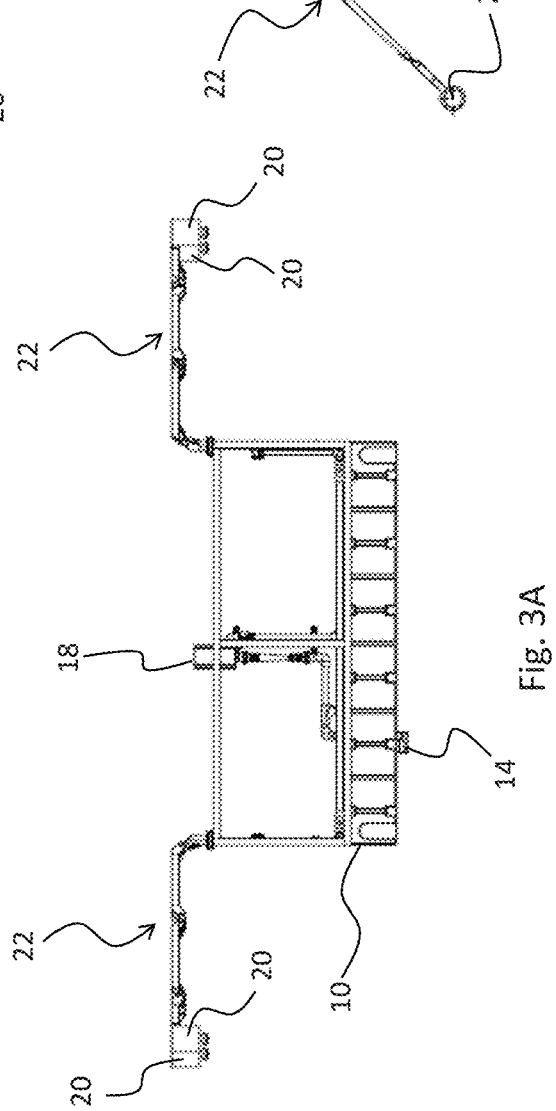
Fig. 3B
Fig. 3A

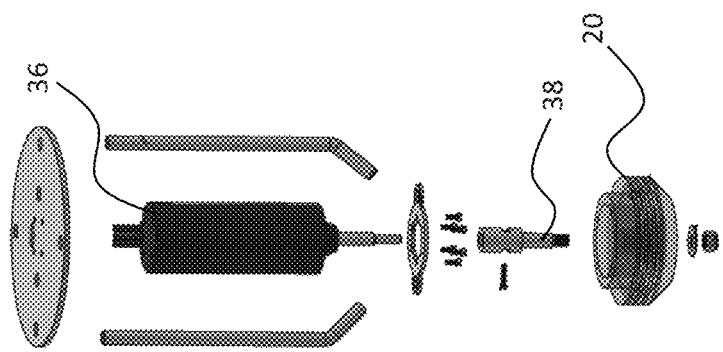

US 10,787,372 B1

SOLAR-POWERED BUOYANT EVAPORATION SYSTEM

BACKGROUND OF THE INVENTION

1. Field of the Invention

This invention relates, generally, to powered floatation devices used in waste water evaporation applications. More specifically, it relates to solar-powered, buoyant systems including one or more flexibly-coupled evaporators or atomizers connected thereto to reduce environmental contaminations associated with waste water.

2. Brief Description of the Prior Art

An abundance of potentially-hazardous waste water presents environmental issues for modern societies. Many industrial operations result in the production of waste as a byproduct, and many times the waste byproducts are deposited within water supplies. The presence of waste within bodies of water not only presents dangers for living organisms within the particular water sources, but also to humans and other animals that interact with the water sources, either directly or indirectly.

A common solution to removing waste products from a body of water is to use natural or enhanced evaporation methods. As the temperature of the water rises, a mixture of the water and the contaminants within the waste evaporate into a gas. However, if the toxic elements within the waste are not eliminated or neutralized during the evaporation process, surrounding organisms (such as plants, grass, and trees, as well as organisms residing within soil) may be subjected to harmful toxins. As such, recent advancements in evaporation technologies have focused on the use of atomizers to turn the evaporated water into droplets of predetermined sizes based on the distance between the atomizer and the edge of the body of the water. These improved atomizers increase the effectiveness of waste water evaporation by minimizing the negative effects of exhausting potential contaminants in gaseous forms, ensuring that the atomized maters remain within the area of the body of water and do not travel to surrounding organisms.

However, current atomizer units have a large footprint and are mostly rigid, thereby reducing the benefits associated therewith. For example, atomizers such as those taught in U.S. Pat. Nos. 8,579,264 and 9,504,932 are restricted to very few degrees of motion through which fluids can be evaporated into droplets, requiring specific rigid orientations to function with efficiency. Moreover, such atomizers typically rely on alternating current power supplies that cannot utilize the advantages provided by photovoltaic cells, which would provide further environmental efficiencies in exterior applications within bodies of water. Moreover, the use of photovoltaic cells to power waste water evaporators extends the potential for such evaporators to be installed and used in remote locations without the need for a power grid or a power generator.

Accordingly, what is needed is an improved buoyant evaporation system including flexibly-attached atomizers that is capable of being powered by solar energy. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas.

Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a buoyant evaporation system including a plurality of flexible atomizers is now met by a new, useful, and nonobvious invention.

The novel structure includes a buoyant wastewater evaporating apparatus having a frame with a bottom surface and a top surface. The bottom surface is configured to reside adjacent to a surface of a body of water and the top surface is configured to be disposed at a height above the surface of the body of water. An arm assembly is secured at a first end to the frame and extends away from the frame to terminate at a second end. An atomizer is secured to the second end of the arm assembly. The arm assembly is configured to pivot with respect to the frame, such that the atomizer can be oriented at varying angles with respect to the frame. The atomizer is configured to receive wastewater from the body of water and disperse the wastewater as droplets within an environment surrounding the body of water. In an embodiment, a plurality of arm assemblies and a plurality of atomizers are used to evaporate wastewater into the environment surrounding the body of water, and each atomizer may be driven by a separate motor.

The arm assembly can include a first portion and a second portion secured together by a hinge, such that each of the first and second portions can pivot with respect to the other portion. To secure the arm assembly to the frame, an anchor coupling may be disposed on the top surface of the frame, with the first portion of the arm assembly being secured to the anchor coupling. The first portion of the arm assembly is pivotable in an x-direction, a y-direction, and a z-direction with respect to the frame due to the connection between the first portion of the arm assembly and the frame, such as via the anchor coupling. A further bracket may extend away from the second portion of the arm assembly, with the bracket being an intermediary component coupling the atomizer to the second portion of the arm assembly, such that the atomizer is pivotable with respect to the second portion due to the bracket.

A direct current motor may be electrically secured to the atomizer. In addition, one or more photovoltaic cells may be secured to the frame and in electric communication with the direct current motor, wherein solar energy captured by the one or more photovoltaic cells supplies energy to the direct current motor and to the atomizer.

A pump may be secured to the bottom surface of the frame, such that the pump is in fluidic communication with the body of water. A fluid conduit is secured to the pump at a first end and secured to the atomizer at a second end. Accordingly, the wastewater from the body of water is transferred to the atomizer via the pump and the fluid conduit.

An object of the invention is to provide a portable, mobile, and buoyant evaporation system that eliminates waste water within a body of water via flexible atomizers secured to the buoyant floatation device of the system, such that the range of motion and the resulting range of atomization is increased. Another object of the invention is to provide a buoyant evaporation system including a direct current motor that is capable of utilizing solar energy through the use of photovoltaic cells, improving the environmental impact of the system and extending the application of evaporators to remote locations without relying on power grids or generators.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1 is a perspective view of a buoyant evaporation system, depicting the atomizers deployed in a default orientation, in accordance with an embodiment of the present invention.

FIG. 2A is a top plan view of the buoyant evaporation system of FIG. 1.

FIG. 2B is a longitudinal side elevation view of the buoyant evaporation system of FIG. 1

FIG. 2C is a lateral side elevation view of the buoyant evaporation system of FIG. 1.

FIG. 3A is a longitudinal side elevation of the buoyant evaporation system of FIG. 1, depicting the atomizers deployed in an extended orientation, in accordance with an embodiment of the present invention.

FIG. 3B is a top plan view of the buoyant evaporation system of FIG. 3A.

FIG. 4A is a perspective view of the buoyant evaporation system of FIG. 1, depicting the atomizers in a retracted orientation, in accordance with an embodiment of the present invention.

FIG. 4B is a top plan view of the buoyant evaporation system of FIG. 4A.

FIG. 4C is a longitudinal side elevation view of the buoyant evaporation system of FIG. 4A.

FIG. 4D is a lateral side elevation view of the buoyant evaporation system of FIG. 4A.

FIG. 5 is an exploded view of a motor and atomizer used in combination with the buoyant evaporation system of FIG. 1, in accordance with an embodiment of the present invention.

DETAILED DESCRIPTION OF INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a buoyant apparatus capable of floating on liquid surfaces, such as bodies of water filled with waste byproducts. The buoyant apparatus supports a plurality of atomizers or evaporation units via rotatable and flexible arms. The arms can achieve 180° adjustments with the respect to a longitudinal axis of the buoyant apparatus, such that the arms can be parallel to a surface of the body of water in both an extended orientation (with the atomizers deployed over the water surface) and a retracted orientation (with the atomizers stored within the surface area of the platform. In addition, the arms can achieve 360° rotational adjustments about the attachment point of the arms to the platform. In addition, the atomizers and arms are powered by low voltage direct current (DC) motors that are capable of capturing and utilizing solar power via photovoltaic cells coupled thereto (the photovoltaic cells are depicted as reference numeral 40 in FIG. 1, shown coupled to frame 11 of buoyant apparatus 10; however, it is appreciated that one or more photovoltaic cells 40 can be secured to platform 12, secured to atomizer 20, integrated into one or more of platform 12, frame 11, and atomizer 20, or coupled to an external platform that is in electric communication with buoyant apparatus 10). As such, the platform can be employed in remote locations without the need for a centralized power grid or a power generator, instead relying on solar energy to atomize and eliminate waste and other contaminants from the body of water.

As shown in FIG. 1, buoyant apparatus 10 includes frame 11 and platform 12, serving as a base unit to which a plurality of atomizers 20 are coupled. Since buoyant apparatus 10 is designed to evaporate waste water, the apparatus is capable of floating on a water surface or of being installed adjacent to a water surface, such as on a dock extending from a shore toward a central point of the body of water. In addition, buoyant apparatus 10 includes fluid pump 14 that is designed to be in communication with the body of water to receive fluid therefrom. Fluid pump 14 is in fluidic communication with the plurality of atomizers 20 via fluid conduits 16, which are depicted in FIG. 1 as pipes directly coupled to fluid pump 14 and to each of the plurality of atomizers 20. As such, fluid pump 14 removes fluid from the body of water, including waste water, and translates the fluid to one or more atomizers 20 for evaporation of the removed fluid. Control panel 18 is secured to buoyant apparatus 10 at either frame 11 or platform 12, such that control panel 18 transmits instructions to the electrical components of buoyant apparatus 10, such as fluid pump 14, atomizers 20, arm assemblies 22, and the motors driving atomizers 20 (which will be discussed in greater detail below). For example, as discussed in detail below, control panel 18 transmits instructions to each arm assembly 22 to be oriented at a predetermined angle with respect to buoyant apparatus 10; in addition, control panel 18 transmits instructions to each atomizer 20 to be oriented at a predetermined angle with respect to each arm assembly 22. Control panel 18 can also selectively turn the motor assembly on and off by opening and closing switches in electric communication with the motor assembly. The motor assembly and the selected angles for the atomizers are discussed in more detail in the descriptions below.

Each of atomizers 20 are secured to buoyant apparatus 10 via arm assembly 22, which secures to anchor coupling 24 disposed on frame 11 of buoyant apparatus. Each arm assembly 22 is flexibly attached to frame 11, such that each arm assembly 22 is capable of 360° horizontal rotations about anchor coupling 24 along an axis parallel to the water surface and the top surface of platform 12. As such, the position of each atomizer 22 with respect to buoyant apparatus 10 can be customized to ensure efficient placement of each atomizer 22. For example, as shown in FIG. 2A, one or more of arm assemblies 22 can be pivoted about anchor coupling 24 such that the arm assemblies 22 extend away from corners of frame 11 and over the water surface. The orientation of arm assemblies 22 shown in FIG. 2A may be referred to as a default configuration, with atomizers 20 being disposed adjacent to buoyant apparatus 10 without fully extending over the water surface, which is shown in later figures.

Figure 2C:
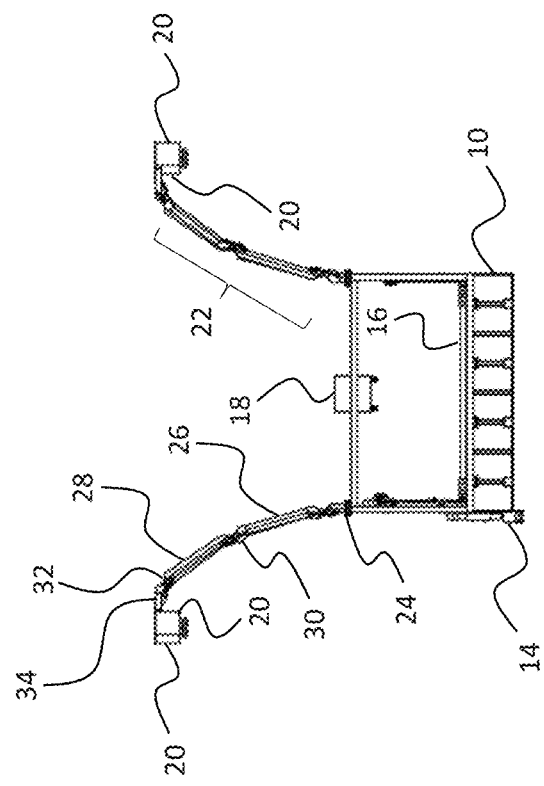
Figure 2B:
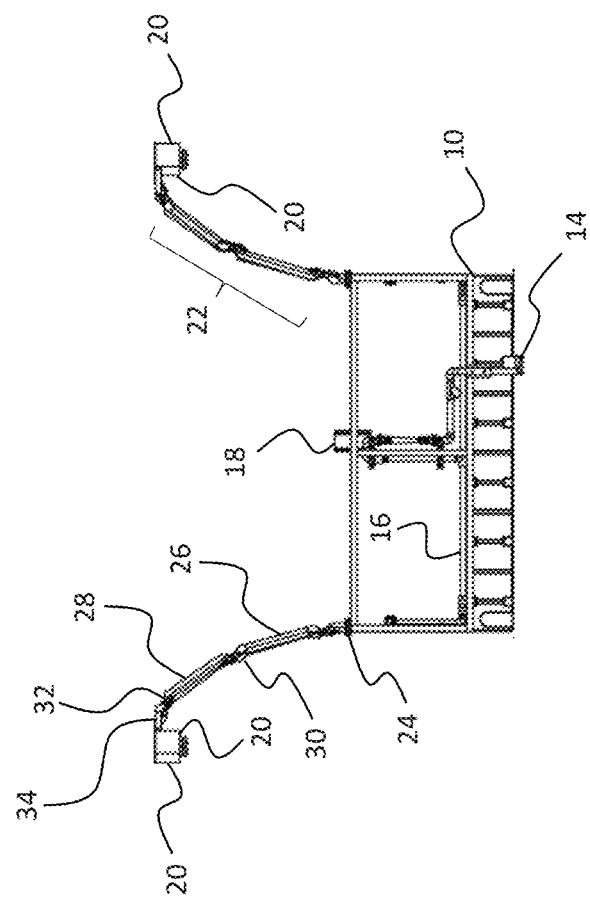
Figure 4B:
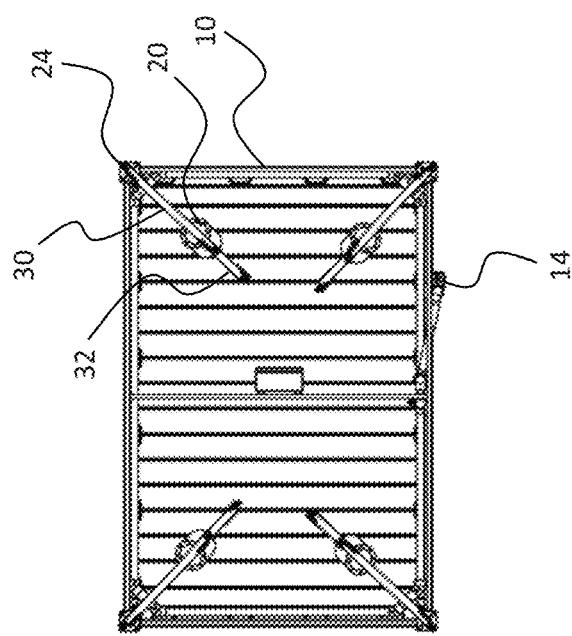
Figure 4A:
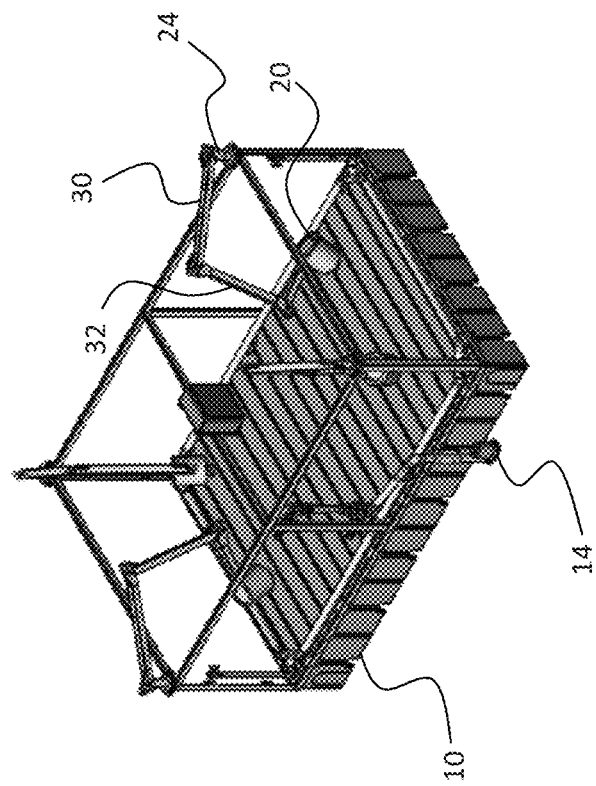
Figure 4D:
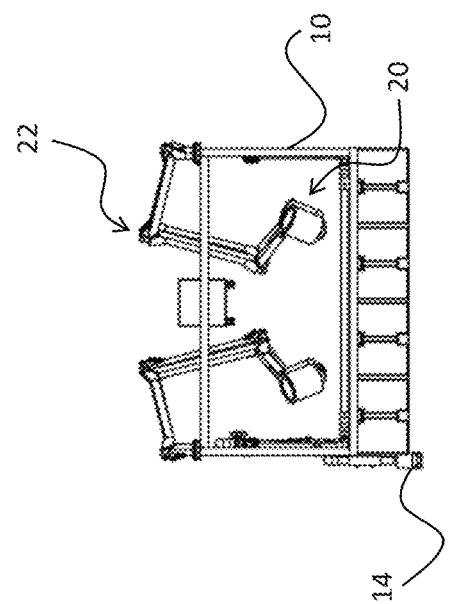
Figure 4C:
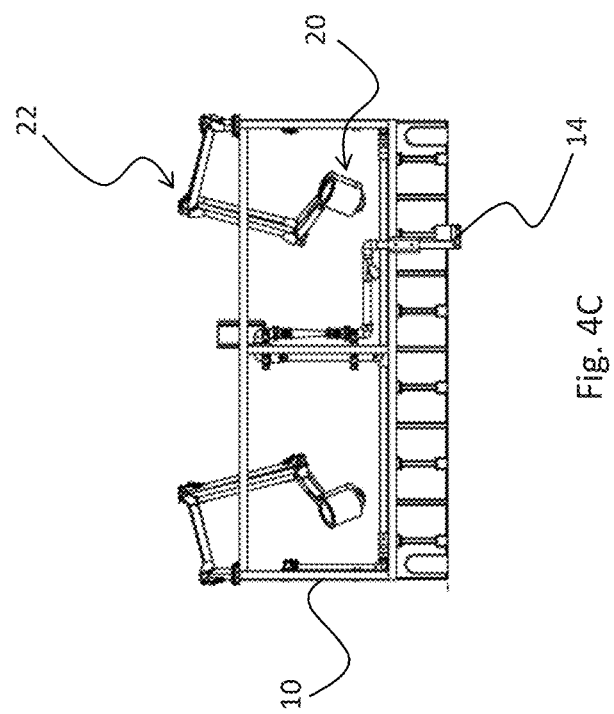

FIGS. 2B-2C show different views of the default configuration and more particularly show the components of arm assemblies 22. It is appreciated that the views depicted in FIGS. 2B-2C are elevation views along a longitudinal axis of buoyant apparatus 10 (in FIG. 2B) and along a lateral axis of buoyant apparatus 10 (in FIG. 2C); as such, only one pair of arm assemblies 22 is visible in each of FIGS. 2B-2C. As shown in FIGS. 2B-2C, each arm assembly 22 includes first portion 26 that is coupled to anchor coupling 24, and second portion 28 that is in mechanical communication with atomizer 20. First portion 26 and second portion 28 are hingedly coupled to each other via first hinge 30, which allows each of first portion 26 and second portion 28 to pivot with respect to each other, forming angles of between approximately 1° to approximately 359° with respect to each other about first hinge 30. In addition, second portion 28 is indirectly coupled to atomizer 20 via second hinge 32, which is in mechanical communication with bracket 34 to which atomizer 20 is secured. As such, atomizer 20 and bracket 34 can pivot with respect to second portion 28 via second hinge 32, such that atomizer 20 forms angles of between approximately 1° to approximately 359° with respect to second portion 28 about second hinge 32. Such flexibility of first portion 26, second portion 28, and atomizer 20 provides for highly customizable placement of each atomizer 20 with respect to the water surface, improving the efficiency of each atomizer 20 and extending the potential for deploying one or more atomizers 20 in different environments. It is appreciated that arm assembly 22 can include only a single hinge point in an embodiment without departing from the object of the assembly, which is flexibility for the positioning of atomizer 20.

As shown in FIGS. 3A-3B, one or more of arm assemblies 22 can extend further away from buoyant apparatus 10 in a deployed configuration as compared with the default configuration depicted in detail in FIGS. 2A-2C. In the deployed configuration, arm assemblies 22 pivot about anchor coupling 24 to form an approximately 90° angle between each arm assembly 22 and each anchor coupling 24, such that each arm assembly 22 extends away from frame 11 and over the water surface, with each arm assembly 22 being parallel to the water surface. In addition, each atomizer 20 is configured to be disposed at a height above the water surface, with each atomizer 20 being angled such that the atomizers 20 are oriented substantially perpendicular with respect to the water surface. As such, atomizers 20 and brackets 34 can pivot with respect to second portion 28 about second hinge 32 of each arm assembly 22, such that each atomizer 20 is deployed at an optimal angle with respect to the water surface. In the deployed configuration, atomizers 20 are disposed above the water surface at an extended position with respect to buoyant apparatus 10, such that waste water drawn through fluid pump 14 and pumped via fluid conduits 16 to one or more of the plurality, of atomizers 20 can be atomized and exhausted away from the water surface via atomizers 20. While FIG. 3B depicts each of arm assemblies 22 oriented at an angle with respect to buoyant apparatus 10 that bisects a 90° formed by each of the corners of frame 11, it is appreciated that, since each arm assembly 22 is capable of 360° horizontal rotation about each anchor coupling 24, one or more of arm assemblies 22 can pivot about one or more of anchor couplings 24 to be differently angled with respect to frame 11.

As shown in FIGS. 4A-4D, arm assemblies 22 can be oriented in a retracted or storage configuration, during which atomizers 20 are not in use. In the retracted orientation, atomizers 20 are disposed above platform 12 of buoyant apparatus 10, such that atomizers 20 are stored within the volume of buoyant apparatus 10. To accomplish the retracted orientation, first portion 30 of each arm assembly 22 hingedly pivots with respect to anchor coupling 24, forming an approximately 90° angle between each arm assembly 22 and each anchor coupling 24. Considering the angle formed in the deployed configuration and the angle formed in the retracted orientation, each arm assembly 22 is capable of pivoting approximately 180° with respect to a vertical axis of buoyant apparatus 10 from a bottom portion of platform 12 to a top portion of frame 11. Such flexibility is such that atomizers 20 can be stored during period of non-use without being exposed to forces acting on an exterior surface of buoyant apparatus 10, such as during period of extreme weather conditions.

As shown in FIG. 5, a motor assembly may be used in combination with one or more atomizers 20. As such, motor 36 secures to atomizer 20 via rotor shaft 38, such that each of atomizers 20 includes an integrally-connected motor 36. Each motor 36 receives energy from control panel 18, which may be captured via one or more photovoltaic cells 40 integrated into or in electric communication with buoyant apparatus 10. An advantage of motor 36 is that, in a preferred embodiment, motor 36 is a direct current (DC) motor, as opposed to the traditional alternating current (AC) motor typically used in implementations of atomizers 20. As such, the embodiments disclosed herein utilize a DC motor 36 that is capable of utilizing solar energy, as well as non-renewable energy sources, to power atomizers 20. Moreover, each DC motor 36 enables an associated atomizer 20 to rotate faster than typical atomizers because higher amperages can be used to spin atomizers 20, leading to a greater rate of atomization as compared to traditional atomizers. Optional motor speed controllers can be used within the motor assembly to vary the motor speed based on the requirements of atomizer 20; such motor speed controllers can be used in a plurality of motor assemblies to select varying speeds for atomizers 20 across a single buoyant apparatus 10. In an embodiment, motor 36 is in communication with a wireless communication component, such as a BLUETOOTH® or other wireless communication protocol. As such, motor 36 can be controlled remotely via a secondary electronic device, such as a cellular phone, a tablet, or other computing node. Via the secondary electronic device, the speed of motor 36 can be altered to change the functioning of atomizers 20, such as to increase or decrease the size of the droplets created via atomizer 20.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A buoyant wastewater evaporating apparatus comprising:
    a frame including a bottom surface configured to reside adjacent to a surface of a body of water and a top surface configured to be disposed at a height above the surface of the body of water, with an anchor coupling disposed on the top surface of the frame;
    an arm assembly including a first portion secured to the anchor coupling of the frame and a second portion secured to the first portion by a hinge, wherein each of the first and second portions can pivot with respect to the other portion; and
    an atomizer secured to a terminal end of the second portion of the arm assembly,
    wherein the first portion arm assembly is pivotable in an x-direction, a y-direction, and a z-direction with respect to the frame due to the connection between the first portion of the arm assembly and the anchor coupling, such that the atomizer can be oriented at varying angles with respect to the frame, and
    wherein the atomizer is configured to receive wastewater from the body of water and disperse the wastewater as droplets within an environment surrounding the body of water.

2. The apparatus of claim 1, further comprising a plurality of arm assemblies disposed about the frame, each of the plurality of arm assemblies being secured to the frame and extending away therefrom, and a plurality of atomizers, each of the plurality of atomizers secured to a respective one of the plurality of arm assemblies.

3. The apparatus of claim 1, further comprising a bracket extending away from the second portion, the bracket being an intermediary component coupling the atomizer to the second portion of the arm assembly, wherein the atomizer is pivotable with respect to the second portion due to the bracket.

4. The apparatus of claim 1, further comprising a direct current motor electrically secured to the atomizer.

5. The apparatus of claim 4, further comprising one or more photovoltaic cells secured to the frame and in electric communication with the direct current motor, wherein solar energy captured by the one or more photovoltaic cells supplies energy to the direct current motor and to the atomizer.

6. The apparatus of claim 1, further comprising a pump secured to the bottom surface of the frame and in fluidic communication with the body of water, and a fluid conduit secured to the pump at a first end and secured to the atomizer at a second end, wherein the wastewater is transferred to the atomizer via the pump and the fluid conduit.

7. A buoyant wastewater evaporating apparatus comprising:
    a frame including a bottom surface configured to reside adjacent to a surface of a body of water and a top surface configured to be disposed at a height above the surface of the body of water;
    a plurality of arm assemblies, each arm assembly including a first portion secured to the frame and a second portion secured to the first portion by a hinge, wherein each of the first and second portions can pivot with respect to the other portion;
    a plurality of atomizers, each atomizer secured to a terminal end of the second portion of a respective one of the plurality of arm assemblies; and
    a bracket secure to each of the plurality of arm assemblies and extending away from the second portion thereof, the bracket being an intermediary component coupling one of the atomizers to the second portion of a respective one of the plurality of arm assemblies, such that the atomizer is pivotable with respect to the second portion due to the bracket,
    wherein each of the plurality of arm assemblies is configured to pivot with respect to the frame, such that each atomizer can be oriented at varying angles with respect to the frame, and
    wherein each atomizer is configured to receive wastewater from the body of water and disperse the wastewater as droplets within an environment surrounding the body of water.

8. The apparatus of claim 7, further comprising a plurality of anchor couplings each disposed on the top surface of the frame, wherein the first portion of each of the plurality of arm assemblies secures to a respective one of the plurality of anchor couplings.

9. The apparatus of claim 8, wherein the first portion of each of the plurality of arm assemblies is pivotable in an x-direction, a y-direction, and a z-direction with respect to the frame due to the connection between the first portion of each arm assembly and the respective one of the plurality of anchor couplings.

10. The apparatus of claim 7, further comprising a plurality of direct current motors, each electrically secured to one of the plurality of atomizers.

11. The apparatus of claim 10, further comprising one or more photovoltaic cells secured to the frame and in electric communication with each of the plurality of direct current motors, wherein solar energy captured by the one or more photovoltaic cells supplies energy to each of the plurality of direct current motors and to each of the plurality of atomizers.

12. The apparatus of claim 7, further comprising a pump secured to the bottom surface of the frame and in fluidic communication with the body of water, and a fluid conduit secured to the pump and to each of the plurality of atomizers, wherein the wastewater is transferred to the atomizers via the pump and the fluid conduit.

13. A buoyant wastewater evaporating apparatus comprising:
- a frame including a bottom surface configured to reside adjacent to a surface of a body of water and a top surface configured to be disposed at a height above the surface of the body of water;
- a plurality of anchor couplings disposed about the top surface of the frame;
- a plurality of arm assemblies, each arm assembly including a first portion secured to a respective one of the plurality of anchor couplings and a second portion, the first and second portions secured together by a hinge, such that each of the first and second portions can pivot with respect to the other portion;
- an atomizer secured to the second portion of each of the plurality of arm assemblies,
- wherein each of the plurality of arm assemblies is configured to pivot with respect to the frame, such that each atomizer can be oriented at varying angles with respect to the frame,
- wherein the first portion of each of the plurality of arm assemblies is pivotable in an x-direction, a y-direction, and a z-direction with respect to the frame due to the connection between the first portion of each arm assembly and a respective one of the plurality of anchor couplings, and
- wherein each atomizer is configured to receive wastewater from the body of water and disperse the wastewater as droplets within an environment surrounding the body of water.

14. The apparatus of claim 13, further comprising a plurality of direct current motors, each electrically secured to one of the atomizers, and one or more photovoltaic cells secured to the frame and in electric communication with each of the plurality of direct current motors, wherein solar energy captured by the one or more photovoltaic cells supplies energy to each of the plurality of direct current motors and to each of the atomizers.

15. The apparatus of claim 13, further comprising a pump secured to the bottom surface of the frame and in fluidic communication with the body of water, and a fluid conduit secured to the pump and to each of the atomizers, wherein the wastewater is transferred to the atomizers via the pump and the fluid conduit.

* * * * *

UNITED STATES PATENT AND TRADEMARK OFFICE
CERTIFICATE OF CORRECTION

Page 1 of 1

PATENT NO. : 10,787,372 B1
APPLICATION NO. : 16/723477
DATED : September 29, 2020
INVENTOR(S) : William McBride Blanchard It is certified that error appears in the above-identified patent and that said Letters Patent is hereby corrected as shown below:

In the Claims

Column 7, Claim 1, Line 41 should read:
wherein the first portion of the arm assembly is pivotable in an Column 8, Claim 7, Line 25 should read:
a bracket secured to each of the plurality of arm assemblies Signed and Sealed this
Eighth Day of December, 2020

Andrei Iancu
*Director of the United States Patent and Trademark Office*